(12) United States Patent
Park (10) Patent No.: US 8,408,778 B2
(45) Date of Patent: Apr. 2, 2013

(54) LIGHT SOURCE AND DISPLAY DEVICE HAVING THE SAME

(75) Inventor: Hyung Hwa Park, Incheon (KR)

(73) Assignee: LG Innotek Co., Ltd., Seoul (KR)

( * ) Notice: Subject to any disclaimer, the term of this patent is extended or adjusted under 35 U.S.C. 154(b) by 459 days.

(21) Appl. No.: 12/698,478

(22) Filed: Feb. 2, 2010

(65) Prior Publication Data
US 2010/0208495 A1 Aug. 19, 2010

(30) Foreign Application Priority Data
Feb. 17, 2009 (KR) .................. 10-2009-0013161

(51) Int. Cl.
*G02B 6/10* (2006.01)
(52) U.S. Cl. ........ 362/618; 362/612; 362/627; 362/97.3
(58) Field of Classification Search .............. 362/612, 362/606, 617–619, 627, 629, 84, 561, 97.2, 362/97.3, 97.1
See application file for complete search history.

(56) References Cited

U.S. PATENT DOCUMENTS

| | | | |
|---|---|---|---|
| 5,982,092 A | 11/1999 | Chen | |
| 7,350,937 B2 * | 4/2008 | Yamamoto et al. | 362/249.01 |
| 2004/0090161 A1 | 5/2004 | Noguchi et al. | |
| 2004/0207995 A1 | 10/2004 | Park et al. | |
| 2006/0001036 A1 | 1/2006 | Jacob et al. | |
| 2006/0268537 A1 * | 11/2006 | Kurihara et al. | 362/34 |
| 2007/0057626 A1 | 3/2007 | Kurihara et al. | |
| 2007/0090383 A1 | 4/2007 | Ota et al. | |
| 2007/0147081 A1 * | 6/2007 | Choi | 362/612 |
| 2008/0067536 A1 | 3/2008 | Komoto et al. | |
| 2008/0158907 A1 * | 7/2008 | Lin et al. | 362/606 |
| 2008/0302977 A1 | 12/2008 | Yao et al. | |
| 2009/0251922 A1 | 10/2009 | Ueyama | |

FOREIGN PATENT DOCUMENTS

| | | |
|---|---|---|
| JP | 2000-133006 | 5/2000 |
| JP | 2003-222861 | 8/2003 |
| JP | 2003-279985 | 10/2003 |
| JP | 2007-109616 | 4/2007 |
| KR | 20-1998-065685 | 12/1998 |
| WO | WO 2006/131924 | 12/2006 |
| WO | WO 2007/086657 | 8/2007 |
| WO | WO 2007/138724 | 12/2007 |

OTHER PUBLICATIONS

Korean Office Action issued in KR Application No. 10-2009-0013161 dated Jul. 30, 2010.
European Search Report issued in EP Application No. 10153414.7 dated Aug. 10, 2010.
European Search Report issued in EP Application No. 10153414.7 dated May 31, 2010.

* cited by examiner

*Primary Examiner* — Jong-Suk (James) Lee
*Assistant Examiner* — Leah S Macchiarolo
(74) *Attorney, Agent, or Firm* — Ked & Associates, LLP (57) ABSTRACT

A display device including a light unit is provided. The light unit may include a light guide plate, a light emitting module, and a color coordinate conversion sheet. The light emitting module may include a plurality of light emitting diodes configured to emit light to a side of the light guide plate. The color coordinate conversion sheet may be positioned on the light guide plate to convert a color coordinate distribution of the light emitted by the light emitting module to a color coordinate distribution that falls within a target distribution range.

26 Claims, 6 Drawing Sheets

LIGHT SOURCE AND DISPLAY DEVICE HAVING THE SAME

CROSS-REFERENCE TO RELATED APPLICATIONS

This claims priority under 35 U.S.C. 126 and 35 U.S.C. 365 to Korean Patent Application No. 10-2009-0013161 (filed in Korea on Feb. 17, 2009), the entirety of which is incorporated herein by reference.

BACKGROUND

1. Field

This relates to a light source and a display device having the same.

2. Background

Display devices may include a cathode ray tube (CRT), a liquid crystal display device (LCD), a plasma display panel (PDP), and an electroluminescent display (ELD). LCDs may display an image by controlling an amount of light incident from the outside. Thus, a backlight assembly may be used to irradiate light onto a liquid crystal panel and display an image.

BRIEF DESCRIPTION OF THE DRAWINGS

The embodiments will be described in detail with reference to the following drawings in which like reference numerals refer to like elements wherein.

DETAILED DESCRIPTION

Reference will now be made in detail to various embodiments, examples of which are illustrated in the accompanying drawings. In description of embodiments, it will be understood that in a case where a layer (or sheet), a region, a pattern, or components is referred to as being 'on' or 'under' another substrate, layer (or film), region or patterns, the 'on' and 'under' include all the meanings of 'directly' and 'indirectly'. Further, references to 'on' and 'under' each layer will be made based on the exemplary illustration in drawings. Also, the thickness of each layer in the drawings is exemplary, and is not limited thereto.

Figure 1:
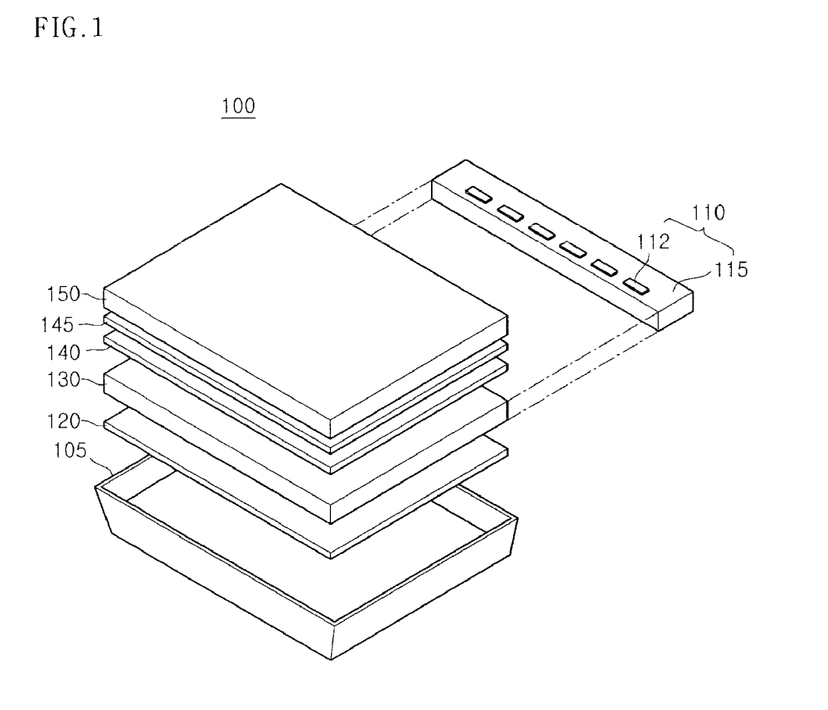
FIG. 1 is a perspective view of a display device in accordance with an embodiment as broadly described herein.

Referring to FIG. 1, a display device 100 as embodied and broadly described herein may include a cover 105 which encloses or houses various components, a light emitting module 110, a reflective plate 120, a light guide plate (or light guide panel, LGP) 130, an optical sheet 140, a color coordinate conversion sheet 145, and a display panel 150. The cover 105, the light emitting module 110, the reflective plate 120, the light guide plate 130, the optical sheet 140, and the color coordinate conversion sheet 145 may together function as a light source.

In the embodiment shown in FIG. 1, the cover 105 includes a recess, with inclined side walls disposed along edges of the cover 105. However, the present disclosure is not limited thereto, and other arrangements may also be appropriate.

The light emitting module 110 may include a board 115 and a plurality of light emitting diodes 112. The light emitting module 110 may be positioned in the recess formed by the cover 105. The board 115 may be, for example, a rigid board, a flexible board, a metal core PCB, a ceramic board, or other type of board as appropriate. The light emitting module 110 may be installed on a cover such as, for example, a mold frame, a chassis, or other cover as appropriate.

The light emitting diodes 112 may be disposed on a surface of the board 115, such as, for example, on the upper surface of the board 115, and may face a corresponding side surface of the light guide plate 130. Alternatively, the light emitting diodes 112 may be disposed on the lower surface of the board 115 when the board is positioned horizontally as shown in FIG. 1, or, when the board 115 is positioned vertically, the light emitting diodes 112 may be disposed on the front surface of the board 115. That is, the light emitting diodes 112 may be disposed on the board 115 in a side view manner or a top view manner.

The light emitting diodes 112 may be spaced apart by a constant interval or at different intervals from each other. Each light emitting diode 112 may be provided in a package in which at least one LED chip is molded in a resin layer. Each of the light emitting diodes 112 may be one of a blue LED chip, a yellow LED chip, a green LED chip, a red LED chip, a UV (Ultraviolet) LED chip, an amber LED chip, a blue-green LED chip, a combination of a fluorescent material and at least one of the LED chips, and other combinations as appropriate.

All of light emitting diodes 112 may emit light having a spectrum of substantially the same color, or a group of the light emitting diodes 112 may emit a spectrum having different colors. For example, a blue LED chip or a three color (red, green, and blue) LED chip may be used for the light emitting diodes 112. The light emitting diodes 112 of the light emitting module 110 may have multi ranks.

More specifically, the light emitting diodes 112 may include LED chips having an substantially the same rank or different ranks, respectively. For example, at least two of the light emitting diodes 112 may include LED chips having different ranks. The light emitting diodes 112 may emit light having a color coordinate distribution that falls outside of a target color coordinate distribution. That is, light emitted by the light emitting diodes may have a color that does not correspond to a target color, or a desired or optimal color, for a particular display device.

The light emitting diodes 112 may have multi color ranks (hereinafter, referred to as multi ranks). The ranks may be obtained by classifying optical characteristics into regions according to a color coordinate, a main wavelength or a peak wavelength. A single rank may be a case in which, for example, the light emitting diodes 112 include blue LED chips, e.g., a rank having the same wavelength. For example, when blue LED chips having wavelengths ranging from 451 to 455 nm are sorted by 1 nm, five ranks, respectively 451 nm, 452 nm, 453 nm, 454 nm, and 455 nm, are generated. When LED chips having only one of the five ranks (i.e., identical wavelengths) are used in LEDs, the LED chips are referred to as light emitting diodes having a single rank. In this case, LED chips having the other ranks cannot be used, and thus are discarded or set aside, yielding waste and/or additional fabrication time and expense.

That is, for example, when a blue LED chip uses a rank having a wavelength of 453 nm, only blue LED chips having a wavelength of 453 nm can be used, and thus chips having ranks other than 453 nm would be discarded. However, in a display 100 as embodied and broadly described herein, ranks having wavelengths near 453 nm may also be used and still achieve the same effect. That is, chips of differing ranks may be used to achieve a desired or target color of light, such as, for example, white light, to achieve the desired display characteristics.

The light guide plate 130 is disposed on a side of the light emitting module 110. The light guide plate 130 may be formed of, for example, a poly carbonate (PC) material, a poly methy methacrylate (PMMA) material, or other material as appropriate. A reflective pattern may be formed on a lower portion of the light guide plate 130.

The first light emitted from the light emitting diodes 112 is incident on the light guide plate 130. The light guide plate 130 guides the first light emitted from the light emitting diodes 112 to the entire region so as to emit the first light as a surface light source.

The reflective plate 120 is positioned on the lower side of the light guide plate 130, and the optical sheet 140 and the color coordinate conversion sheet 145 are positioned on the upper side thereof.

The reflective plate 120 reflects light leaking from the light guide plate 130 to the display panel 150. The optical sheet 140 transmits light emitted by the light guide plate 130 to the display panel 150 in a uniform brightness distribution.

The optical sheet 140 may be, for example, a diffusion sheet, a horizontal and vertical prism sheet, a brightness improving sheet, or other type of sheet as appropriate. The diffusion sheet spreads incident light, the horizontal and vertical prism sheet collects incident light into a display region, and the brightness improving sheet collects lost light to improve brightness. The optical sheet 140 is configured to refract, reflect, and diffuse incident light, and may include the color coordinate conversion sheet 145 (hereinafter "conversion sheet 145").

The conversion sheet 145 may be formed by coating a transparent sheet such as, for example, a plastic or acryl sheet, with fluorescent material, or by mixing a fluorescent material into the material of a transparent sheet. The fluorescent material may include at least one of yellow, red, blue, and green materials.

The conversion sheet 145 may be positioned on at least one of the upper and lower sides of the optical sheet 140. In certain embodiments, the conversion sheet 145 may be provided in plurality.

The conversion sheet 145 may convert a portion of the incident first light to a second light. The first light and the second light may be mixed and converted to the target color. In this embodiment, when the color of light emitted by a combination of one of an LED chip and/or a light emitting diode falls outside of the target color, the resulting color may be shifted back into the target color.

Figure 2:
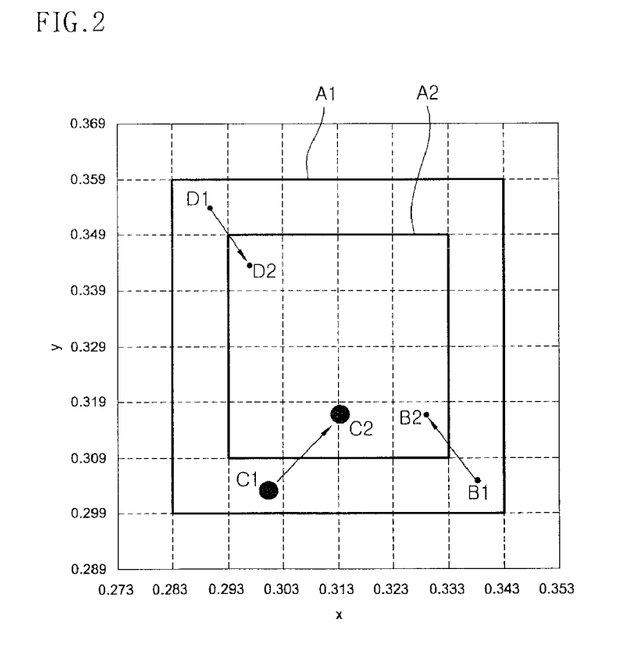
FIG. 2 illustrates shifts of color coordinate distribution using a color coordinate conversion sheet.

Referring to FIGS. 1 and 2, when characteristics (brightness and color) of the first light emitted by the light emitting diodes 112 are measured, the characteristics may be scattered in a region A1 including points B1, C1, and D1 on CIEx/CIEy coordinates. When LED chips having one or more colors are configured in a multi rank manner, the characteristics of the light emitting diode 112 having multi ranks may be distributed in the region A1, and outside of a target region A2 on CIE color coordinates. The region A1 may be a standard region, and the region A2 may be a target region of the standard region A1.

For example, when the conversion sheet 145 includes a yellow based fluorescent material, the point C1 of the first light may be shifted to a point C2 that falls with the target region A2 due to the yellow based fluorescent material in the conversion sheet 145. Similarly, when the conversion sheet 145 is a red based fluorescent sheet, the point D1 of the first light may be shifted to a point D2 within the target region A2 by the red based fluorescent sheet. Likewise, when the conversion sheet 145 is a green based fluorescent sheet, the point B1 of the first light may be shifted to a point B2 within the target region A2 by the green based fluorescent sheet.

The conversion sheet 145 shifts the color of the first light from the standard region A1 to the target region A2. More specifically, the conversion sheet 145 may shift the color coordinate of one or more of the points B1 C1, and D1 disposed within the standard region A1 of FIG. 2 to a position close to a center coordinate of the target region A2 having, for example, CIEx=0.313 and CIEy=0.329, which may be representative of the desired color of light, or target color, such as, for example, white light. The conversion sheet 145 may include at least one type of fluorescent material to convert a color rank of light emitted by the light emitting diode 112 to a target color rank.

Referring to FIG. 1, the display panel 150 may be disposed on the conversion sheet 145 or the optical sheet 140. For example, the display panel 150 may be an LCD panel that includes first and second transparent substrates facing each other, and a liquid crystal layer positioned between the first and second substrates. A polarizer plate may be attached to at least one surface of the display panel 150 in a suitable manner. The display panel 150 displays information using light that passes through the optical sheet 140 and the conversion sheet 145. The display device 100 may be, for example, portable terminals, monitors of notebook computers and laptop computers, televisions, and other such devices.

Figure 3:
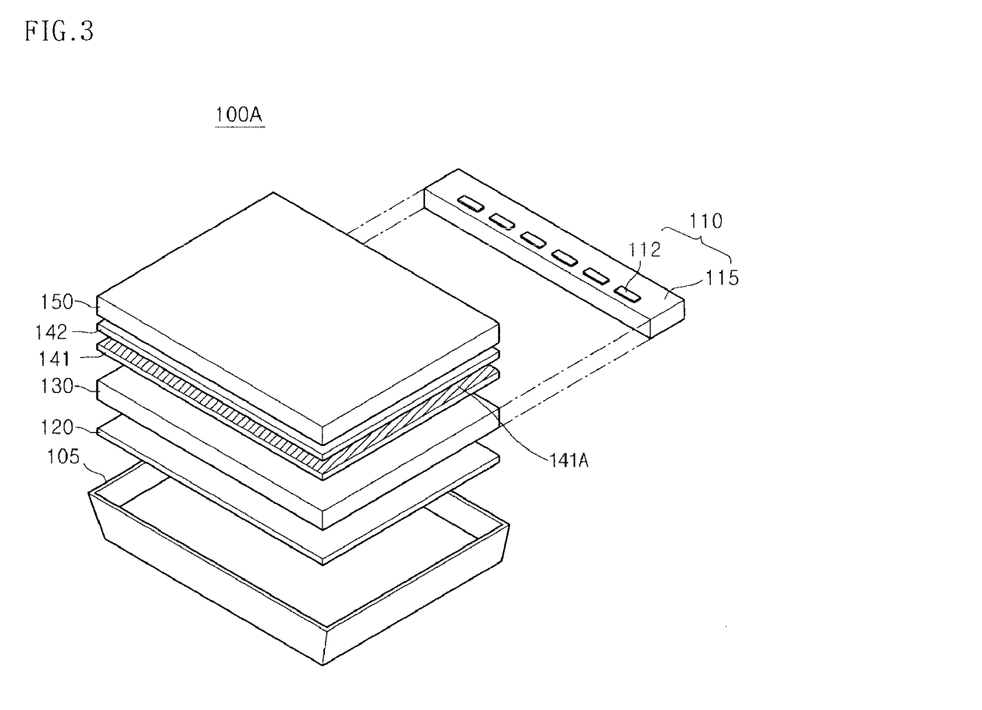
FIG. 3 is a perspective view of a display device in accordance with another embodiment as broadly described herein.

FIG. 3 is a perspective view of a display device according to another embodiment as broadly described herein. In describing this embodiment, wherever possible, like reference numerals will be used to denote like elements, and further detailed description thereof will be omitted.

The display device 100A shown in FIG. 3 may include a cover 105, a light emitting module 110, a reflective plate 120, a light guide plate 130, and a display panel 150 similar to the embodiment shown in FIG. 1. The display device 100A may also include a diffusion sheet 141 including a color conversion material, and a prism sheet 142. The diffusion sheet 141 and the prism sheet 142 may be considered optical sheets.

An upper surface 141A of the diffusion sheet 141 may be coated with a color coordinate material. The color conversion material may be, for example, a fluorescent material that may include at least one of yellow, red, blue, and green fluorescent materials. In this case, an incident first light and a second light emitted by the color conversion material may have a complementary color relationship with respect to target color coordinates.

The color coordinate distribution of the first light incident on the diffusion sheet 141 may be converted to a target color coordinate distribution by the fluorescent material. That is, the fluorescent material may excite a portion of the incident first light to generate the second light, the second light having a different wavelength. At this point, the incident first light and the second light may be mixed and converted to the target color.

Although the diffusion sheet 141 shown in FIG. 3 is coated with a color conversion material on an upper surface thereof in this embodiment, in alternative embodiments, a color conversion material may be added into the diffusion sheet 141. In a similar manner, instead of the diffusion sheet 141, the prism sheet 142 may be coated with a color conversion material, or a color conversion material may be added into the prism sheet 142.

In this embodiment, the light emitting module 110 may include at least one type of LED chips that have multi ranks, or the light emitting diodes 112 that have multi ranks, so as to increase the use yield of LED chips and light emitting diodes.

Figure 4:
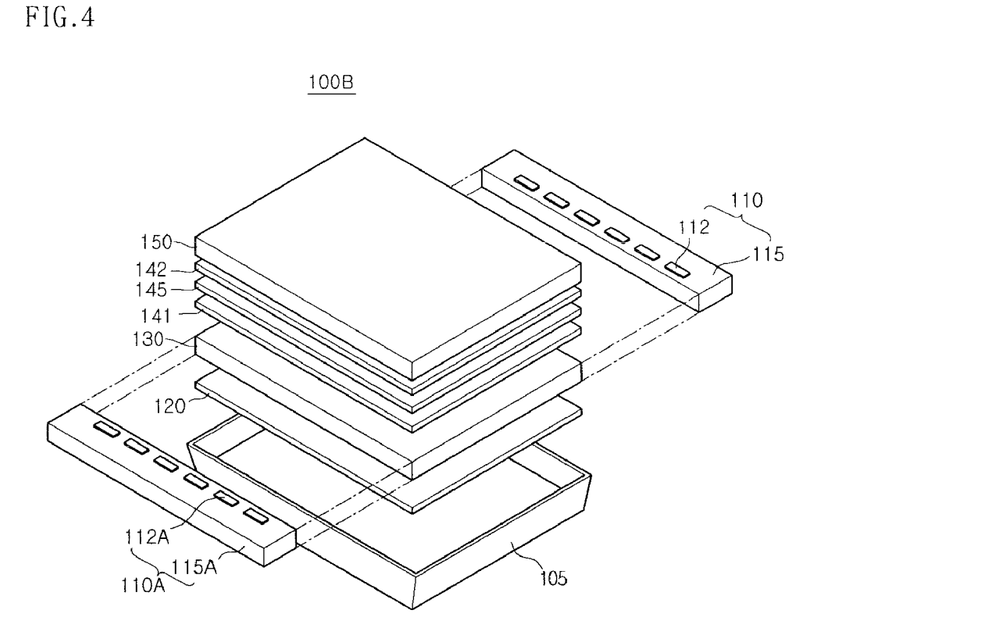
FIG. 4 is a perspective view of a display device in accordance with another embodiment as broadly described herein.

FIG. 4 is a perspective view of a display device according to another embodiment as broadly described herein. In describing this embodiment, wherever possible, like reference numerals will be used to denote like elements, and further detailed description thereof will be omitted.

A display device 100B as shown in FIG. 4 may include a plurality of light emitting modules 110 and 110A provided at two opposite ends of the light guide plate 130. The first light emitting module 110 includes the board 115 and the light emitting diodes 112, and is positioned at a first end of the light guide plate 130. The second light emitting module 110A includes a board 115A and light emitting diodes 112A, and is positioned at a second end of the light guide plate 130.

The conversion sheet 145 may be positioned between the diffusion sheet 141 and the prism sheet 142 to excite portions of light emitted by the light emitting modules 110 and 110A to emit light having different wavelengths. The conversion sheet 145 converts the color of light emitted by the first light emitting module 110 and the second light emitting module 110A to a target color. For example, the conversion sheet 145 may shift the color coordinates of the points B1, C1, and D1 distributed in the region A1 of FIG. 2 to a position close to a target coordinate, e.g., the coordinate having CIEx=0.313 and CIEy=0.329 representative of a desired/target color of light, such as, for example, white light.

Figure 5:
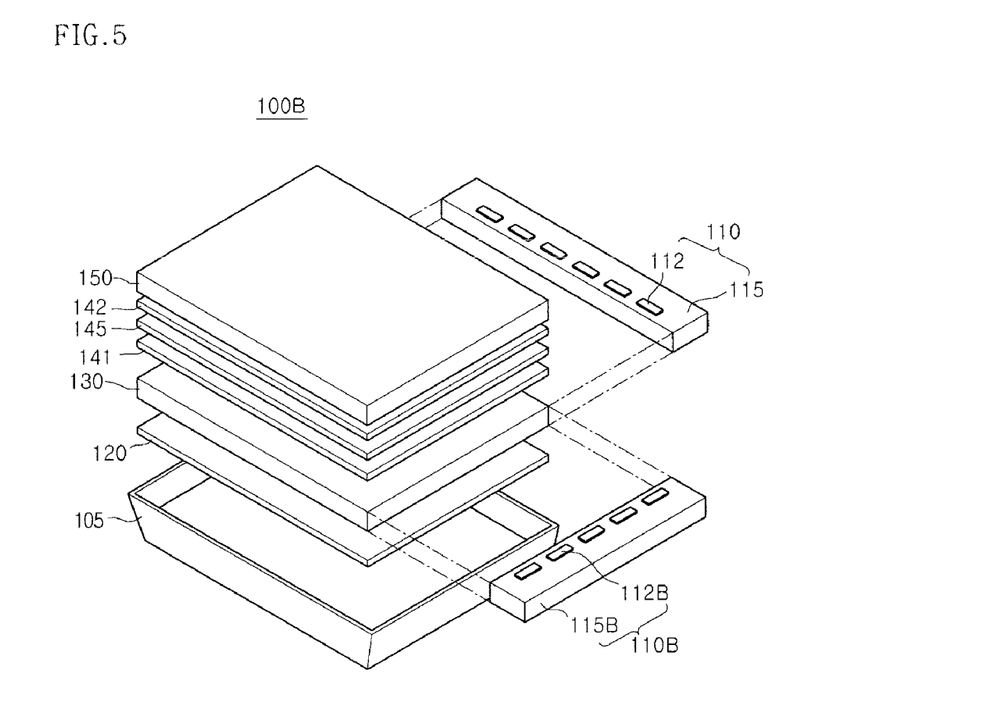
FIG. 5 is a perspective view of a display device in accordance with another embodiment as broadly described herein.

FIG. 5 is a perspective view of a display device according to another embodiment as broadly described herein. In this embodiment, wherever possible, like reference numerals will be used to denote like elements, and further detailed description thereof will be omitted.

A display device 100C as shown in FIG. 5 may include a plurality of light emitting modules 110 and 110B provided at adjacent/neighboring sides of the light guide plate 130. The conversion sheet 145 may be positioned between the diffusion sheet 141 and the prism sheet 142. The first light emitting module 110 may extend in a longitudinal direction of the light guide plate 130. The second light emitting module 110B may include light emitting diodes 112B and a board 115B, and may extend in a lateral direction of the light guide plate 130. When the lateral length of the light guide plate 130 is different from the longitudinal length thereof, the light emitting modules 110 and 110B may be positioned along the longitudinal and lateral directions of the light guide plate 130, respectively.

In this embodiment, when the color of light emitted by a combination of one of the light emitting modules 110 and 110B, one of LED chips, and one of the light emitting diodes 112B is outside of a target color distribution, a resulting abnormal color distribution may be shifted into the target color distribution.

Figure 6:
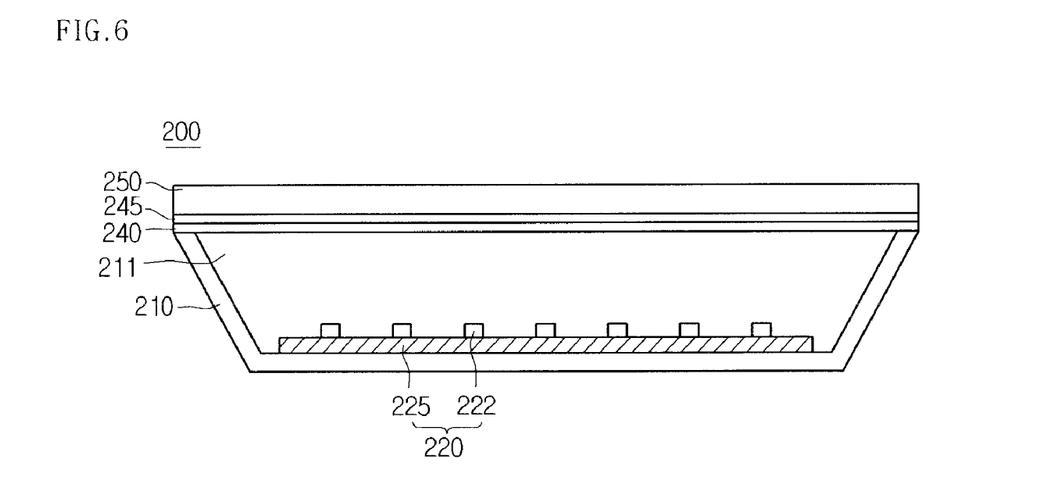
FIG. 6 is a perspective view of a display device in accordance with another embodiment as broadly described herein.

FIG. 6 is a perspective view of a display device according to another embodiment as broadly described herein. In this embodiment, wherever possible, like reference numerals will be used to denote like elements, and further detailed description thereof will be omitted.

The display device 200 shown in FIG. 6 may include a cover 210, a light emitting module 220, an optical sheet 240, a conversion sheet 245, and a display panel 250. The cover 210, the light emitting module 220, the optical sheet 240, and the conversion sheet 245 may function together as a light source. The cover 210 may define a recess 211, with an inclined side wall that extends along an outer peripheral edge of the bottom cover 210. Other arrangements may also be appropriate.

The light emitting module 220 may be arranged in at least one row and at least one column in the cover 210, or in other arrangements as appropriate. The light emitting module 220 may include light emitting diodes 222 arranged in at least one column on a board 225. Alternatively, the light emitting diodes 222 may be installed on the cover 210, without the board 225. The light emitting diodes 222 may be installed on the board 225 in a chip on board manner, a package on board manner, or other manner as appropriate.

The color of a first light emitted by the light emitting module 220 may be shifted to a target color by the conversion sheet 245. In this embodiment, when the color coordinate distribution of light emitted by a combination of one of the light emitting module 220, one of LED chips, and one of the light emitting diodes 222 is outside of the target color coordinate distribution, the resulting abnormal color coordinate distribution may be shifted to the target color coordinate distribution.

Figure 7:
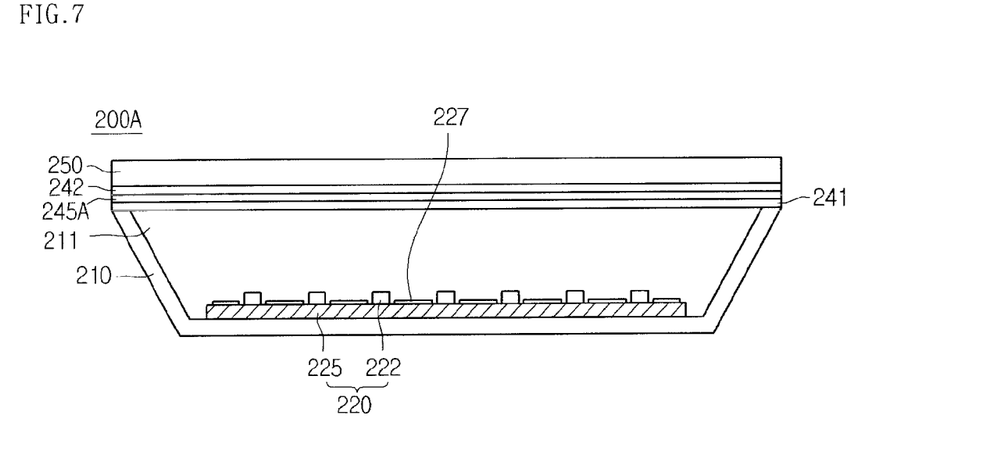
FIG. 7 is a perspective view of a display device in accordance with another embodiment as broadly described herein.

FIG. 7 is a perspective view of a display device according to another embodiment as broadly described herein. In this embodiment, wherever possible, like reference numerals will be used to denote like elements, and further detailed description thereof will be omitted.

A display device 200A as shown in FIG. 7 may include the cover 210, the light emitting module 220, and the display panel 250. The display device 200A may also include a diffusion sheet 241, a prism sheet 242, and a conversion sheet 245A. The light emitting module 220 may be arranged in at least one row and at least one column in the cover 210, or in another arrangement as appropriate. The light emitting module 220 may include the light emitting diodes 222 arranged on the board 225. Reflective materials or reflective sheets 227 may be disposed around the light emitting diodes 222. The conversion sheet 245A may be a light transmitting sheet including a fluorescent material. Alternatively, through a coating process, the conversion sheet 245A may be formed on the upper surface of the diffusion sheet 241 or on the lower surface of the prism sheet 242.

Figure 8:
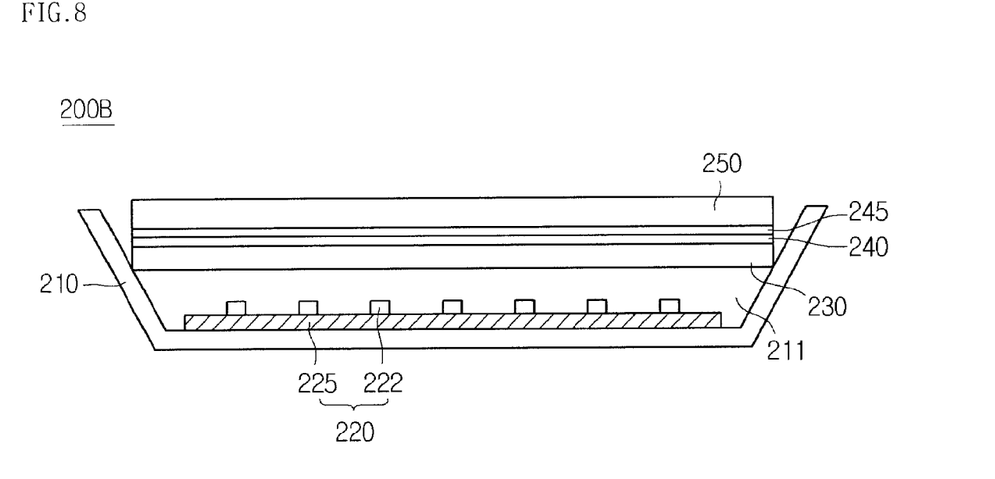
FIG. 8 is a perspective view of a display device in accordance with another embodiment as broadly described herein.

FIG. 8 is a perspective view of a display device according to another embodiment as broadly described herein. In this embodiment, wherever possible, like reference numerals will be used to denote like elements, and further detailed description thereof will be omitted.

A display device 200B as shown in FIG. 8 may include the cover 210, the light emitting module 220, the optical sheet 240, the conversion sheet 245, and the display panel 250. The display device 200B may also include a light guide plate 230. The light guide plate 230 emits light emitted by the light emitting module 220 as a surface light source. The optical sheet 240 may be configured as a prism sheet.

The conversion sheet 245 shifts the color coordinate distribution of light emitted by the light guide plate 230 to a target color coordinate distribution. That is, when more than one light emitting module 220 is provided, the conversion sheet 245 excites portions of a first light emitted by the light emitting modules 220 so as to convert the first light to a second light, and emits the first light and the second light such that the first light and the second light are mixed to the color coordinate distribution of a target light. Accordingly, the color of light incident on the display panel 250 is the target color, which has been shifted from the color of light originally emitted by the light emitting modules 220.

Figure 9:
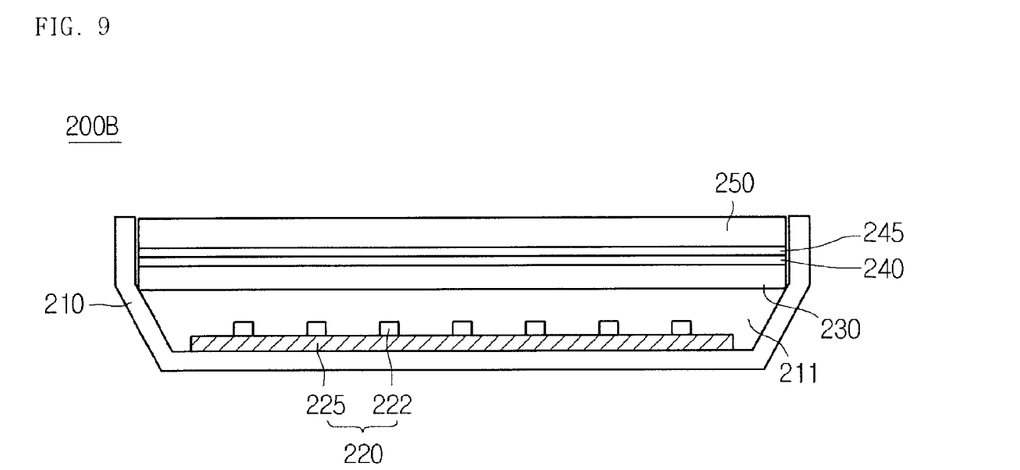
FIG. 9 is a perspective view of a display device in accordance with another embodiment as broadly described herein.

The cover 210 may accommodate the light emitting module 220, the light guide plate 230, the optical sheet 240, and the conversion sheet 245. The outer peripheral surface of the cover 210 that extends from the bottom surface of the cover 210 may be inclined, vertical, or bent several times to accommodate these components. For example, as shown in FIG. 9, a lower portion of the outer peripheral surface of the cover 210 may extend upward at an incline from the bottom surface, and the upper portion thereof may be bent and then extend vertically upward therefrom.

Figure 10:
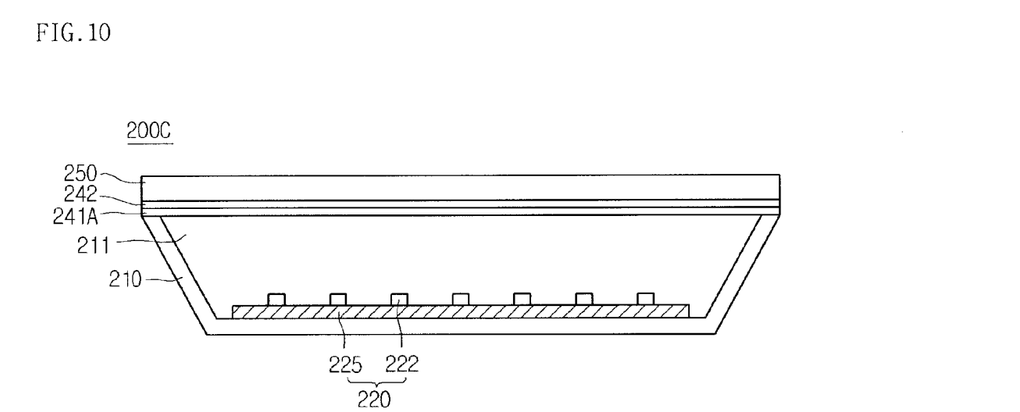
FIG. 10 is a perspective view of a display device in accordance with another embodiment as broadly described herein.

FIG. 10 is a perspective view of a display device according to another embodiment as broadly described herein. In this embodiment, wherever possible, like reference numerals will be used to denote like elements, and further detailed description thereof will be omitted.

A display device 200C as shown in FIG. 10 may include the cover 210, the light emitting module 220, the prism sheet 242, and the display panel 250. The display device 200C may also include a diffusion sheet 241A including a color conversion material. The upper or lower surface of the diffusion sheet 241A may be coated with a layer of color conversion material, or a color conversion material may be included in the material from which diffusion sheet 241A is formed.

In this embodiment, when the color of light emitted by a light source falls outside of a target color distribution, the color distribution may be shifted into the target color distribution by the diffusion sheet 241A or by a layer including a color conversion material. Accordingly, the light emitting diodes 222 of the light emitting module 220 may use LEDs having ranks adjacent to and out of the target color distribution, that is, LEDs having multi ranks or LEDs having failure ranks, thus improving yield use.

Figure 11:
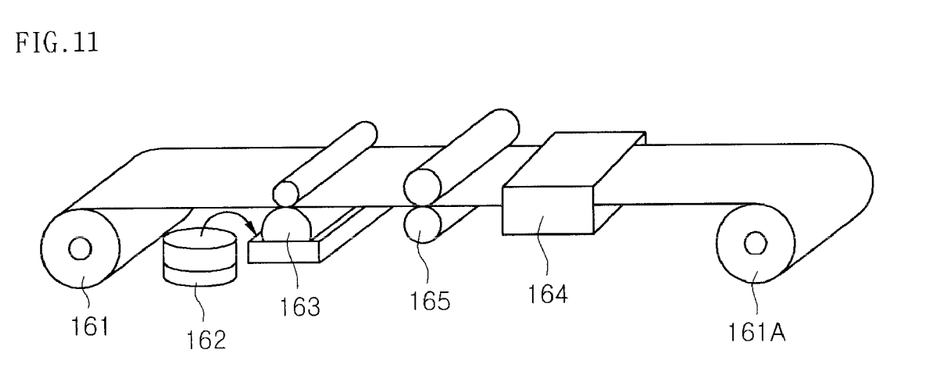
FIG. 11 is a schematic view of a process of fabricating a color coordinate conversion sheet as embodied and broadly described herein.

FIG. 11 illustrates fabrication of a conversion sheet as embodied and broadly described herein.

As shown in FIG. 11, a sheet of raw material 161 formed of transparent resin may be coated with a solvent 162 mixed with a specific fluorescent dye by a coating apparatus 163. The coated material may be conveyed by a roller 165, and then dried by a drying apparatus 164 so as to form a conversion sheet 161A. A surface of the conversion sheet 161A is coated with the solvent 162 by, for example, a laminating method, or other process as appropriate.

Fluorescent dye may be obtained by mixing powders including various colors such as, for example, yellow, red, blue, and green, a resin (e.g., transparent acryl) having an appropriate viscosity, and alcohol in a predetermined ratio. A coloring matter and a distribution amount of the fluorescent dye may be determined based on a difference between the color of incident light and the color of target light.

Alternatively, the solvent 162 may be mixed with the raw sheet material. Such a fluorescent material may be added in this manner when the diffusion sheet or the prism sheet is fabricated.

In a display device as embodied and broadly described herein, to obtain the target color coordinate, light emitting diodes having multi ranks, that is, light emitting diodes including LED chips out of a target color range may be used instead of light emitting diodes having a single rank. In addition, a color coordinate distribution that falls outside of the target color range may be shifted into the target color coordinate distribution by the sheet including a color coordinate conversion material. Accordingly, the use yield of LED chips and light emitting diodes may be increased and fabrication cost may be decreased.

In a display device as embodied and broadly described herein, the use yield of light emitting diodes may be increased, fabrication cost may be decreased and a color coordinate distribution may be adjusted on the light unit. In addition, the rank tolerance of an LED chip of a light emitting diode may be increased.

Embodiments provide a light unit including a color coordinate conversion sheet that converts a color coordinate distribution of light emitted from a plurality of light emitting diodes to a predetermined color coordinate distribution, and a display device having the light unit.

Embodiments provide a light unit including a layer or sheet that shifts the color coordinate distribution of a first light emitted from a plurality of light emitting diodes to a target color coordinate distribution so as to emit a second light, and a display device having the light unit.

A light unit as embodied and broadly described herein may include a light guide plate; a light emitting module comprising a plurality of light emitting diodes emitting a light to a side of the light guide plate; and a color coordinate conversion sheet disposed on the light guide plate and converting a color coordinate distribution of the light emitted from the light emitting module to another color coordinate distribution.

A light unit as embodied and broadly described herein may include a bottom cover; a light emitting module comprising a plurality of light emitting diodes disposed on the bottom cover; an optical sheet on the light emitting module; and a color coordinate conversion layer disposed on the light emitting module and emitting a light for converting a color coordinate distribution of light emitted from the light emitting module to another color coordinate distribution.

A display device as embodied and broadly described herein may include a bottom cover; a light emitting module comprising a plurality of light emitting diodes disposed on a side of the bottom cover; a light guide plate on a side of the light emitting module; an optical sheet on the light guide plate; a display panel on the optical sheet; and a color coordinate conversion layer disposed on the light guide plate and converting a color coordinate distribution of light emitted from the light guide plate to another color coordinate distribution.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, numerous variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A light source, comprising:
   a light guide plate;
   at least one light emitting module positioned so as to emit light incident on the light guide plate, wherein the at least one light emitting module comprises a plurality of light emitting diodes;
   an optical sheet on a top surface of the light guide plate; and
   a conversion sheet provided on a top surface of the optical sheet, wherein the conversion sheet converts a color of the light emitted by the at least one light emitting module to a target color,
   wherein the optical sheet includes a diffusion sheet and a prism sheet aligned with the diffusion sheet, and wherein the optical sheet is disposed on the light guide plate and the conversion sheet such that the conversion sheet converts the color of the light passing through the diffusion sheet and the prism sheet.

2. The light source of claim 1, wherein the conversion sheet includes a fluorescent material having at least one color.

3. The light source of claim 1, wherein the conversion sheet includes at least one of red, green, blue, or yellow fluorescent materials.

4. The light source of claim 1, further comprising a reflective plate positioned under the light guide plate.

5. The light source of claim 1, wherein the at least one light emitting module comprises a first light emitting module positioned at a first side edge of the light guide plate, and a second light emitting module positioned at a second side edge of the light guide plate.

6. The light source of claim 5, wherein the first and second side edges of the light guide plate are opposite each other.

7. The light source of claim 5, wherein the first and second side edges of the light guide plate are adjacent to each other.

8. The light source of claim 1, wherein at least two of the plurality of light emitting diodes have different color coordinate distributions within a same color spectrum.

9. The light source of claim 1, wherein at least two of the light emitting diodes comprise a plurality of light emitting diode chips emitting light of multi ranks with a wavelength difference within a blue color spectrum therein, respectively.

10. The light source of claim 9, wherein the light plurality of emitting diode chips comprise at least one of a blue light emitting diode chip, a green light emitting diode chip, a yellow light emitting diode chip, an amber light emitting diode chip, or a blue-green light emitting diode chip.

11. The light source of claim 1, wherein the conversion sheet is configured to excite a portion of a first light emitted by the plurality of light emitting diodes so as to convert the portion of the first light to a second light, and to mix the first light and the second light so as to provide a third light having the target color.

12. The light source of claim 11, wherein the target color falls within a range in which x of CIEx is between approximately 0.293 and 0.333, and y of CIEy is between approximately 0.309 and 0.349.

13. The light source of claim 12, wherein light emitted by the light guide plate has a color coordinate distribution that is outside of that of the target color.

14. The light source of claim 1, wherein a size of the conversion sheet is substantially equal to a size of the light guide plate.

15. The light source of claim 1, wherein the light guide plate, the at least one light emitting module and the conversion sheet are configured to be coupled to a cover having a receiving surface and side walls extending along an outer peripheral edge of the receiving surface, the side walls defining an open face of the cover so as to form a receiving space therein.

16. The light source of claim 15, wherein the at least one light emitting module is positioned adjacent to the light guide plate within the receiving space on the receiving surface of the cover, and the conversion sheet is positioned on a distal edge of the cover defined by an exposed surface of the side walls of the cover.

17. The light source of claim 15, wherein the at least one light emitting module is positioned adjacent to the light guide plate within the receiving space on the receiving surface of the cover, and the conversion sheet is positioned within the receiving space of the cover, spaced apart from the light guide plate and at least one light emitting module.

18. The light source of claim 15, wherein the side walls of the cover extend at an incline from a first end thereof that is adjacent to the receiving surface of the cover to a second end thereof that defines the open face of the cover.

19. The light source of claim 15, wherein the side walls of the cover extend at an incline from a first end thereof that is adjacent to the receiving surface of the cover to an intermediate point of the side walls, and wherein the side walls are bent at the intermediate point so as to extend in a direction that is perpendicular to the receiving surface of the cover from the intermediate point to a second end thereof that defines the open face of the cover.

20. A display device, comprising:
    a cover;
    a light emitting module provided on the cover, the light emitting module comprising a plurality of light emitting diodes;
    a light guide plate provided at a side of the light emitting module;
    an optical sheet provided on the light guide plate, the optical sheet including a diffusion sheet and a prism sheet aligned with the diffusion sheet;
    a display panel provided on the optical sheet; and
    a conversion layer provided between the optical sheet and the display panel, wherein the conversion layer converts a first color of light emitted by the light guide plate to a target color, and wherein the conversion layer converts the first color of the light passing through the diffusion sheet and the prism sheet.

21. The display device of claim 20, wherein the conversion layer shifts a color coordinate distribution of the light emitted by the light guide plate to a color coordinate having CIEx=0.313 and CIEy=0.329.

22. The display device of claim 20, wherein the color coordinate conversion layer comprises a coating of color coordinate conversion material provided on a surface of the diffusion sheet.

23. A light source, comprising:
    a light guide plate;
    at least one light emitting module positioned so as to emit light incident on the light guide plate, wherein the at least one light emitting module comprises a plurality of light emitting diodes;
    an optical sheet on a top surface of the light guide plate;
    a conversion sheet provided on a top surface of the optical sheet, wherein the conversion sheet converts a color of the light emitted by the at least one light emitting module to a target color; and
    a reflective plate positioned under the light guide plate, wherein the light emitting module is positioned at a side edge of the light guide plate, and the optical sheet includes a diffusion sheet and a prism sheet on the diffusion sheet, and the conversion sheet is coated with a color coordinate material on an upper surface of the diffusion sheet such that the conversion sheet converts the color of the light diffusing by the diffusion sheet.

24. The light source of claim 23, wherein at least two of the light emitting diodes comprise a plurality of light emitting diode chips emitted light of multi ranks with a wavelength difference from each other within a blue color spectrum therein, respectively.

25. The light source of claim 24, wherein the conversion sheet is configured to excite a portion of a first light emitted by the plurality of light emitting diodes so as to convert the portion of the first light to a second light, and to mix the first light and the second light so as to provide a third light having the target color, wherein the target color falls within a range in which x of CIEx is between approximately 0.293 and 0.333, and y of CIEy is between approximately 0.309 and 0.349.

26. The light source of claim 23, wherein at least two of the plurality of light emitting diodes have different color coordinate distributions within a same blue color spectrum.

* * * * *